(12) United States Patent
Bontinck et al.

(10) Patent No.: US 12,503,860 B2
(45) Date of Patent: Dec. 23, 2025

(54) ROOF CONSTRUCTION FOR A TERRACE CANOPY, KIT OF PARTS FOR ASSEMBLING THE ROOF CONSTRUCTION, AND TERRACE CANOPY COMPRISING THE ROOF CONSTRUCTION

(71) Applicant: Renson Outdoor NV, Waregem (BE)

(72) Inventors: Floris Bontinck, Heusden (BE); Frederik Van Luchene, Machelen-Zulte (BE)

(73) Assignee: Renson Outdoor NV, Kruisem (BE)

( * ) Notice: Subject to any disclaimer, the term of this patent is extended or adjusted under 35 U.S.C. 154(b) by 509 days.

(21) Appl. No.: 18/033,256

(22) PCT Filed: Oct. 20, 2021

(86) PCT No.: PCT/IB2021/059649
§ 371 (c)(1),
(2) Date: Apr. 21, 2023

(87) PCT Pub. No.: WO2022/084872
PCT Pub. Date: Apr. 28, 2022

(65) Prior Publication Data
US 2023/0392382 A1 Dec. 7, 2023

(30) Foreign Application Priority Data
Oct. 22, 2020 (BE) .................................. 2020/5743

(51) Int. Cl.
*E04F 10/10* (2006.01)
*E04B 7/16* (2006.01)
(Continued)

(52) U.S. Cl.
CPC .............. *E04F 10/10* (2013.01); *E04B 7/166* (2013.01); *E04H 15/18* (2013.01); *E04B 7/163* (2013.01);
(Continued)

(58) Field of Classification Search
None
See application file for complete search history.

(56) References Cited

U.S. PATENT DOCUMENTS 4,739,816 A * 4/1988 Dodich .................. A01G 9/222
160/172 R
5,782,441 A * 7/1998 Shimizu ............... H02G 3/0608
248/68.1
(Continued)

FOREIGN PATENT DOCUMENTS

BE 1019766 A3 12/2012
BE 1022563 A1 6/2016
(Continued)

OTHER PUBLICATIONS

International Search Report and Written Opinion for PCT Application No. PCT/IB2021/059649, dated Feb. 1, 2022, 14 pages.

*Primary Examiner* — Phi D A
(74) *Attorney, Agent, or Firm* — Dickinson Wright PLLC

(57) ABSTRACT

A roof construction comprises a frame that has a transverse direction, a longitudinal direction, an inside and outside; a roof construction formed by a plurality of mutually parallel transverse elements positioned on the inside of the frame, wherein each transverse element has a support element and a slat, wherein the slat is rotatably attached to a corresponding support element, wherein the support elements are attached to the frame; displacement elements for shifting the support elements in the longitudinal direction between a spread out position and a stacked positions; and a plurality of cable guides that are attached between two successive transverse elements and together form a part of a cable guide for guiding a cable from the frame to at least one of the transverse elements. Thus, the electrical components are (Continued)

integrated into and/or attached to the transverse elements with power and the roof cover is formed of rigid elements.

20 Claims, 7 Drawing Sheets

(51) Int. Cl.
    *E04H 15/18*     (2006.01)
    *E04D 13/064*     (2006.01)
    *E04D 13/08*     (2006.01)
    *H02G 11/00*     (2006.01)

(52) U.S. Cl.
    CPC ............ *E04D 13/064* (2013.01); *E04D 13/08* (2013.01); *H02G 11/006* (2013.01)

(56) References Cited

U.S. PATENT DOCUMENTS

| | | | | |
|---|---|---|---|---|
| 2008/0066640 A1* | 3/2008 | Hutchinson | .......... | H02G 11/006 104/89 |
| 2016/0333587 A1* | 11/2016 | Veys | ................... | E04F 10/0685 |
| 2019/0145107 A1* | 5/2019 | Byszenski | ............... | E04F 10/10 160/62 |
| 2019/0338528 A1* | 11/2019 | Torman | .................... | E04F 10/10 |
| 2020/0087912 A1* | 3/2020 | Konings | ................. | E04B 1/342 |
| 2020/0315101 A1* | 10/2020 | Nowé | .................... | A01G 9/241 |
| 2021/0355685 A1* | 11/2021 | Terenzi | ................... | E04F 10/10 |
| 2022/0341166 A1* | 10/2022 | Hwang | ..................... | E04B 7/18 |
| 2022/0341181 A1* | 10/2022 | Abeel | ..................... | E04B 7/163 |
| 2023/0151614 A1* | 5/2023 | De Frene | ................. | E04C 3/07 52/27 |
| 2023/0392381 A1* | 12/2023 | Brabant | ................... | E04F 10/10 |
| 2024/0360659 A1* | 10/2024 | De Rycke | ............. | E04B 1/2403 |
| 2024/0384531 A1* | 11/2024 | Vanluchene | ........... | E04B 7/163 |

FOREIGN PATENT DOCUMENTS

| | | | | |
|---|---|---|---|---|
| EP | 2631384 A1 | 8/2013 | | |
| EP | 3443177 A1 | 2/2019 | | |
| EP | 3392426 B1 | 12/2019 | | |
| FR | 2788291 A1 * | 7/2000 | ............. | E04D 3/08 |
| IT | BA20130060 U1 | 3/2015 | | |
| WO | 2013121448 A1 | 8/2013 | | |

* cited by examiner

ROOF CONSTRUCTION FOR A TERRACE CANOPY, KIT OF PARTS FOR ASSEMBLING THE ROOF CONSTRUCTION, AND TERRACE CANOPY COMPRISING THE ROOF CONSTRUCTION

CROSS-REFERENCE TO RELATED APPLICATION(S)

This present application is a national stage application of International Patent Application No. PCT/IB2021/059649, filed Oct. 20, 2021, which claims priority to Belgium Patent Application No. BE2020/5743, filed Oct. 22, 2020, the disclosures of which are hereby incorporated by reference in their entireties.

TECHNICAL FIELD

The current invention is a roof construction for a terrace canopy. The current invention also involves a set of parts for assembling the roof construction and a terrace canopy encompassing the roof construction.

PRIOR ART

Canopies are usually set up to protect of outdoor area or to free them up. These types of canopies are often set up at residences, restaurants, shops etc. to protect an outdoor terrace or the like from the rays of the sun, precipitation and/or wind or even to temporarily let in the sun. These canopies may be designed in the form of an awning, a pergola, a veranda, a carport, a pavilion, etc.

This type of terrace canopy typically comprises a roof construction that is at least partially supported by columns. In exceptional cases, the roof construction can also be supported by another roof construction. The roof construction is generally made up of multiple beams made up of one or more frames in which a roof infill can be attached. The beams themselves are often a combination of multiple individual profiles. This type of roof construction is typically supported by four (or more) columns between which a wall infill can be provided. Fewer columns can also be used in the case of a roof construction supported by other structures, such as the wall of an existing structure.

Within the context of a roof construction for canopies, there are typically four orientations (namely top, bottom, outside and inside) for the frame of the roof construction. In this, "top" refers to the part of the roof construction that is oriented or will be toward the top surface (i.e. the sky, e.g. the open air), "bottom" to the section of the roof construction that is oriented or will be toward the ground surface (i.e. the ground, e.g. the floor of the terrace), "outside" to the part of the roof construction oriented or will be away from the roof (i.e. away from the roof infill) and "inside" to the part of the roof construction that is oriented or will be toward the inside of the roof (i.e. facing toward the roof infill).

The roof infill according to the current invention is of the type formed of a plurality of mutually parallel transverse elements positioned on the inside of the frame and which can slide between a spread out position and a stacked position, whereby the mutual distance between two successive transverse elements is smaller in the stacked position than in the spread out position. The transverse elements are made up of slats that rotate around their axes.

An example of such a roof construction is described in BE 1022563 A1. In this roof construction, the transverse elements are formed by slats that are attached on one end of it on sliding support elements. The slats together form a roof infill.

One problem with this type of roof construction is that it is not possible to integrate electrical components in to the sliding slat, such as lighting, heating etc. There is namely no way of installing a power cable to the sideways sliding slats.

WO 2013/121448 A1 also shows a roof construction for a terrace canopy. In this roof construction, the roof infill is formed by a screen that is attached to a number of transverse supports that slide in the longitudinal direction of the roof construction. There is lighting in the supports that is powered by a power cable that runs from the frame to the sliding supports. The power cable is integrated into the screen hanging between the supports, in particular there is a lateral strip at the end of the screen through which the cable runs. In other words, the screen serves both as the roof infill and as a cable guide by the provision of a cable duct formed by a lateral strip.

DESCRIPTION OF THE INVENTION

An object of the present invention is to provide electrical components in the slats of the roof constructions published in BE 1022563 A1.

This object is realized by a roof construction for a terrace canopy, whereby the roof construction is equipped with: a frame that has a transverse direction, a longitudinal direction, an inside and outside; a roof construction formed by a plurality of mutually parallel transverse elements positioned on the inside of the frame, whereby each transverse element has a support element and a slat, whereby the slat is at least one end rotatably attached to a corresponding support element, whereby the support elements are attached to the frame; displacement elements for shifting the support elements in the longitudinal direction between a spread out position and a stacked positions; and a plurality of cable guides that are attached between two successive transverse elements and together form a part of a cable guide for guiding a cable from the frame to at least one of the transverse elements.

The provision of a plurality of cable guides allows the cable, such as a power cable, to be guided between two successive transverse elements of the roof infill so that the cable nearly continually supported from the frame to the desired slat and is guided in the cable guides. In this way it is possible to have electrical and/or electronic components integrated into and/or attached to the slats and equip them with, for example, the necessary power. The cable may also serve for communication between external entities, such as a sensor (e.g. a rain sensor) or a processor, and the electrical and/or electronic components integrated into and/or attached to the transverse elements.

In addition, the cable guides are independent of the transverse elements that form the roof infill. This is in contrast to the roof construction published in WO 2013/121448 A1 where the screen serves both as a roof infill and cable guide. In other words, the current invention allows for the design of a roof infill made of rigid elements which is not possible for the roof construction published in WO 2013 121448 A1, because the cable guide there is integrated into the roof infill and thus must be sufficiently flexible for the folding of the power cable when displacing the transverse elements.

The roof infill is further formed by slats, the advantages of which are understood to be known to the professional. In addition, there are already various systems known for the displacement of slats, see BE 1022563 A1 for example. By using the known displacement elements these do not have to be adapted for the power provision which is advantageous.

In one embodiment of the current invention, the cable guides have a first end connected to a corresponding first transverse element and a second end attached to a corresponding second transverse element, the ends of which, in the spread out position of the transverse elements are at a first distance from each other, whereby the total length of each cable guide is greater than said first distance.

Because the cable guides have a total length that is longer than the distance between the ends in their installed position, the cable guides have at least one bending zone and/or buckle zone in the spread out position of the transverse elements. On the one hand, this makes it easier to fold the cable guides when displacing the transverse elements, so a lower force is necessary. In addition, the bending and/or buckle also determines the direction towards which the cable guides fold when the transverse elements are displaced. Through the knowledge of this direction, it is possible to design the roof construction so that the cable guides, when folding under the influence of the displacement of the transverse elements, cannot come near the transverse elements and/or the displacement elements so that there is no entanglement of the cable guides in them. The chance of defects is therefore reduced.

In an advantageous embodiment of the current invention, the cable guides, in the spread out position of the transverse elements, are at least partially arched with arc height that in particular falls between 1% and 30% and preferably between 10% and 20% of said first distance.

It appears that a bend has advantages over a buckling zone. A buckling zone results in a relatively sharp angle in the folded state of the cable guides, which can cause damage to the cable. In addition, depending on the thickness of the cable, in particular with a relatively thick cable, it is not possible to fold the cable in an approximately equally sharp angle as the buckle in the cable guides. The arc height of the bow is optimized in function of the desired bend. The lower limit ensures that the cable guides, in the spread out position of the transverse elements, are sufficiently bent so that they further fold in the desired direction when displacing the transverse elements. The upper limit primarily limits the space necessary for cable guides in both positions of the transverse guides, because the higher the arc height, the longer the cable guide is and thus more room is necessary in the roof construction for the cable guides through which the space for additional functionality is reduced and/or the roof construction takes up more volume.

In one embodiment of the current invention, the cable guides move along a predetermined path when the transverse elements are moved between their spread out position and the stacked position, the predetermined path is separated from the movement elements and/or the predetermined path is located in a space that is mainly parallel to an underside of the frame and/or the predetermined path is separate from the transverse elements.

Considering that the movement elements of the transverse elements are typically located above or under the transverse elements, it is advantageous to have the cable guides fold in a flat orientation or at least in an orientation that does not interfere with the transverse elements and/or the movement elements. In this way, the cable guides are separated from the transverse elements and/or the movement elements. There is thus no entanglement possible of the cable guides so that the chance of defects is reduced.

In one embodiment of the current invention the cable guides, in the spread out position of the transverse elements have an arched form oriented toward the inside of the frame.

As described above, the arch shaped cable guides are advantageous. It is also advantageous to orient the arch toward the inside of the frame because there is typically more space available. The outside of the roof construction must be tightly finished and thus does not always have the necessary space for the cable guides to fold when the transverse elements are moved. In addition, the outside of the roof construction sometimes is also used for other purposes, such as the integration of a vertical sun screen and/or vertical walls, such as sliding panels or folding panels. From this, the space on the outside of the roof construction may already be taken up by other elements.

In one embodiment of the current invention the cable guides have a spine with cable attachment elements that extend toward the inside of the frame and which are equipped for holding the cable listed. The cable attachment elements may be formed by at least one of: hooks, Velcro, bands.

The use of a spine with cable attachment elements is a minimalist embodiment through which the required amount of material per cable guide is reduced. In addition, even though the cable guides may be formed as a cable duct, the current embodiment is more advantageous because the cable can be easily attached with the cable attachment elements without needing to lead the cable through a duct. The various cable attachment elements allow for a flexible design.

In an advantageous embodiment of the current invention, the cable attachment elements are formed by hooks, in particular L-shaped or C-shaped hooks, whereby at least some of the hooks are at a distance from the spine that is greater than and preferably 20% greater than the thickness of said cable.

In this embodiment, the distance between the spine and the farthest end of the hooks is greater than the thickness of the cable. In this way, even if the cable is placed in the cable guides, there is play between the cable and the cable guides. This means that, in the spread out position of the transverse elements, the cable must undergo a less sharp bend than the cable guides. This reduces the friction on the cable with frequent movements of the transverse elements.

In one embodiment of the current invention the cable guides have first attachment elements at the ends and that the transverse elements are equipped with two attachment elements, whereby the first of the two attachment elements together are provided for the attachment of the cable guides to the transverse elements.

In this embodiment, the cable guides are formed as separate attachable and removable elements on the roof construction. It is thus possible to place the cable guides only where necessary, such as only up to the transverse elements where power is required and not for others. There thus must be no excess cable guides attached. This also makes replacing a damaged cable guide easier, because only one cable guide must be replaced.

In an advantageous embodiment of the current invention, the first and second attachment elements include a male and female element that interlock with one another. Preferably, the female elements are formed by one or more grooves and the male elements by one or more hooks that together form a click connection.

The use of elements that interlock allows for the placement and/or removal of the cable guides without using tools, so the installation is quick and easy. A click connection is essentially a connection that allows for rapid and easy installation without using tools.

In one embodiment of the current invention, the cable guides are made, preferably integrally, in particular using injection molding, of plastic, preferably a thermoplastic such as polyvinyl chloride (PVC), polyamide (PA), polyethylene (PE) or polypropylene (PP or an elastomer such as rubber, preferably a thermoplastic elastomer or composite materials, preferably fiber-reinforced plastics, such as fiberglass reinforced plastic.

Injection molding is a known technique for mass production of plastic elements so that the production costs of the cable guides remain limited. The integral makeup of the cable guides increases their rigidity and ensures a simple design compared with multi-component cable guides. The use of plastic is also advantageous both regarding production costs, sustainability and the desired elastic properties compared to other materials (such as metal).

In one embodiment of the current invention the ends of the cable guides are attached to the support elements.

By attaching the cable guides to the support elements, they do not have to be attached to the slats, so the cable guides are not subject to the rotation of the slats.

In one advantageous embodiment of the current invention, there is a distance between the ends of the slats and the cable guides in the stacked position of the transverse elements.

Through this type of distance, there is no chance that the cable guides (and the cable attached to them) come into contact with the slats, so there can be no actual entanglement.

In one embodiment of the current invention, at least one slat is equipped with at least one electrical component that is equipped with power via a power cable attached in the cable guides.

In this embodiment, the roof construction is therefore equipped with additional functionality integrated into the transverse elements. Examples of this type of functionality are lights, in particular LED lights, audio, such as integrated speakers, imaging such as built in screens and/or projectors, communication media, such as Bluetooth or Wi-Fi, sensors such as a rain sensor, wind sensor, light sensor etc. Power generating media can also be provided in the transverse elements, such as a solar cell, and the power generated transported via the power cable.

In one embodiment of the current invention, the roof construction has an additional cable guide attached between the frame and one transverse element, whereby the additional cable guide together with the other cable guides form a cable guide for encompassing the said cable from the frame to at least one of the transverse elements. Preferably, the additional cable guide is identical to the other cable guides.

The provision of an additional cable guide between a first slat (i.e. the slate of which the cable is in direct connection with the frame, which does not necessarily have to be the first slat from the side of the frame), and the frame and this also prevents that this section of cable causing defects and/or a blockage of the displacement elements. By making the additional cable guide identical to the other cable guides, there is no need for additional parts which would increase the cost and complexity of the roof construction.

The advantages described above are also achieved with an embodiment of the current invention in which the roof construction also has the additional cable that is installed in said cable guide.

The advantages described above are also achieved with a set of parts for building a roof construction as described above, whereby the set contains the transverse elements, the displacement elements and the cable guides.

The advantages described above are also achieved with a terrace canopy involving a roof construction as described above.

SUMMARY DESCRIPTION OF THE DRAWINGS

The invention will be described in detail below using the following description and the additional drawings.

EMBODIMENTS OF THE INVENTION

Figure 1:
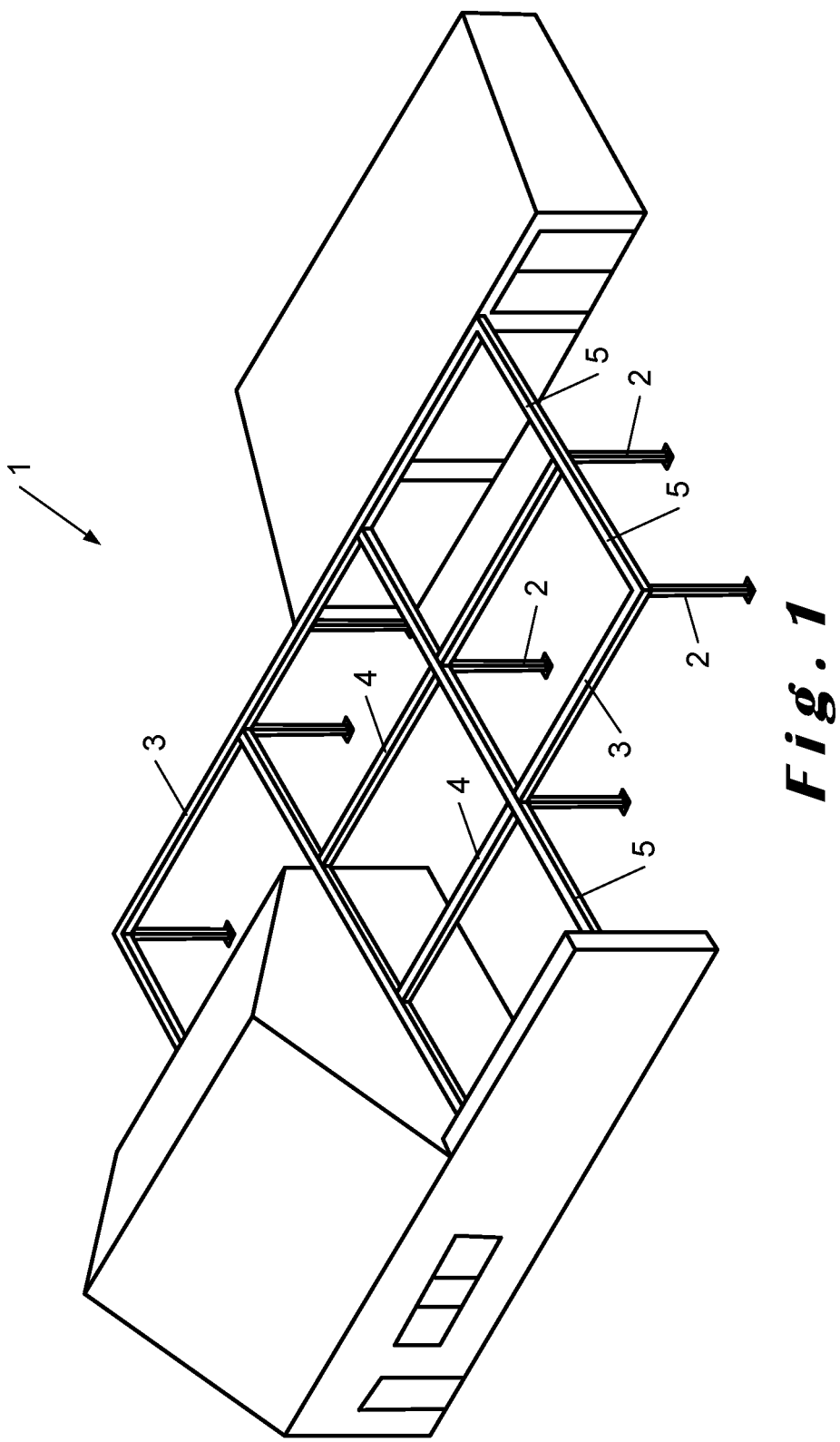
FIG. 1 shows a schematic image of a terrace canopy.

The current invention will be described below using the specific embodiments and with reference to certain drawings, but the invention is not limited to these and is only defined by the claims. The drawings shown here are only schematic representations and not limiting. In the drawings, the measurements of certain parts may be shown larger, which means that the parts in question may not be to scale, and are shown thus for illustrative purposes. The dimensions and the relative dimensions are not necessarily consistent with the actual practical embodiments of the invention.

In addition, terms such as "first", "second", "third" and the like in the descriptions and in the claims are used to differentiate between comparable elements are not necessarily to indicate a sequential or chronological order. The terms in question are exchangeable in the suitable circumstances, and the embodiments of the invention may work in other sequences than those described or illustrated here.

The term "encompassing" and derived terms as used in the claims must not be interpreted as limited to the tools that are then reported; the term does not exclude other elements or steps. The term must be interpreted as a specification of the reported features, whole numbers, steps or components referred to without excluding the presence or addition of one or more additional features, whole numbers, steps or components or groups thereof. The range of an expression such as "a device encompassing the elements A and B" is thus not only limited to devices that purely consist of components A and B. What is mean by contrast, is that, regarding the current invention, the relevant components are A and B.

The term "nearly" includes variations of +/−10% or less, preferably +/−5% or less, more preferably +/−1% or less, and even more preferably +/−0.1% or less from the specified condition to the extent that the variations are applicable to function in the current invention. One must understand that the term "nearly A" is also intended to encompass "A".

FIG. 1 illustrates a terrace canopy 1 for a ground surface, such as a terrace or garden. The terrace canopy includes a number of columns 2 that support the various beams 3, 4, 5. The columns and beams together form frames to which wall infills 6 and/or roof coverings 7 may be attached as described below. The terrace canopy 1 includes three types of beams 3, 4, 5, namely:
- a beam 3 that serves on the outside of the terrace canopy 1 as an external pivot beam 3;
- a beam 4 that serves central in the terrace canopy 1 as a central pivot beam 4; and
- a beam 5 that serves as a tension beam 5.

It will also be appreciated that the beams 3, 4, 5 can also be attached to other structures, such as a wall or facade instead of just supporting the columns 2 as shown in FIG. 1. In this way, the terrace canopy 1 is generally used for protecting an outside space, as well as for an interior space.

Figure 2:
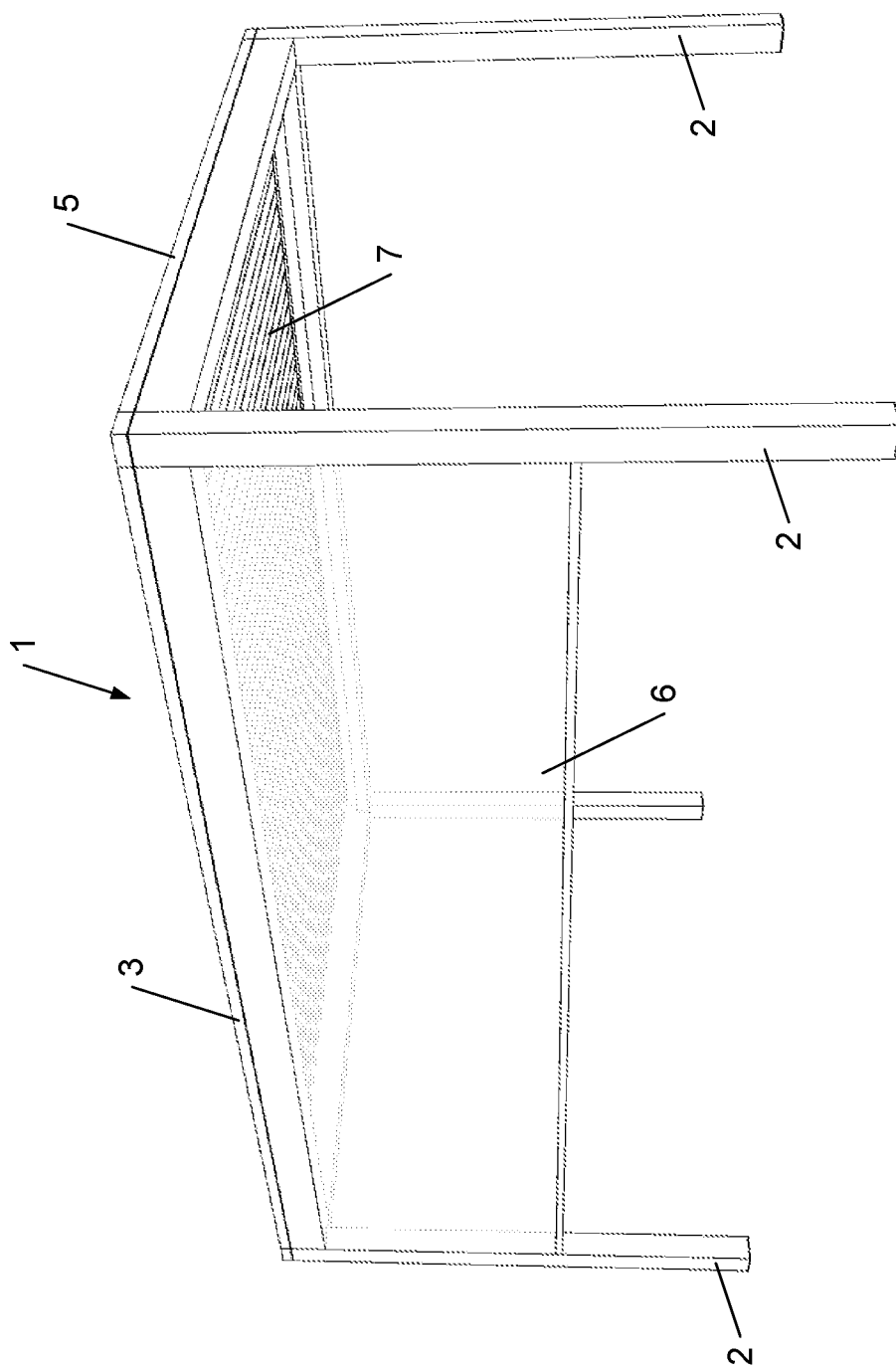
FIG. 2 shows one embodiment of the terrace canopy in more detail.

The terrace canopy 1 shown in FIG. 2 encompasses four support columns 2 that support a frame, also called a roof frame. The frame is formed of two external pivot beams 3 and two tension beams 5 between which there is a roof covering 7. Between the two support columns 2 and a pivot beam 3 or tension beam 5 there may optionally be a wall infill 6.

Wall infills 6 are typically meant to cover openings under the terrace canopy 1 between the columns 2. The wall infills 6 may be installed fixed or mobile. Mobile side walls encompass, for example, roll-up or roll-down screens and/or wall elements that are set up to slide against each other. Fixed installed side walls can be made of various materials, such as plastic, glass, metal, textile, wood, etc. Combinations of various wall infills 6 are also possible. FIG. 2 illustrates a wall infill in the form of a rollable screen 6. The screen 6 extends between two bordering columns 2 and can be rolled from the external pivot beam 3. The screen 6 primarily serves as a wind and/or sun screen.

According to the current invention, the roof cover 7 is formed by slats that are connected to pivot beams 3 and are rotatable. The slats can rotate between an open position and a closed position. In the open position, there is a space between the slats through which air, for example, can be let in to the space underneath or can leave this space underneath. In the closed position, the slats form a closed roof so that the space below can be protected from wind and/or precipitation, such as rain, hail or snow. After removing precipitation, the slats are typically set up at an angle to each other toward one of the two pivot beams 3.

The slats are typically made of a rigid material. This may be aluminum. Aluminum has many advantages as a material, it is both robust and light, resistant to poor weather conditions and requires little maintenance. Other materials are also suitable and the advantages and disadvantages of them are understood to be known to the professional. A slat can be produced using various techniques depending on the material, including extrusion, milling, forged, cast, welded etc. The suitable production technique is assumed to be known to the professional. Preferably, the slats are produced using an extrusion process. Additional fill-in elements may be used, such as of polycarbonate, glass, wood etc. to fill in hollow slats at least partially, such as to lend a different look to the slat.

Figure 3A:
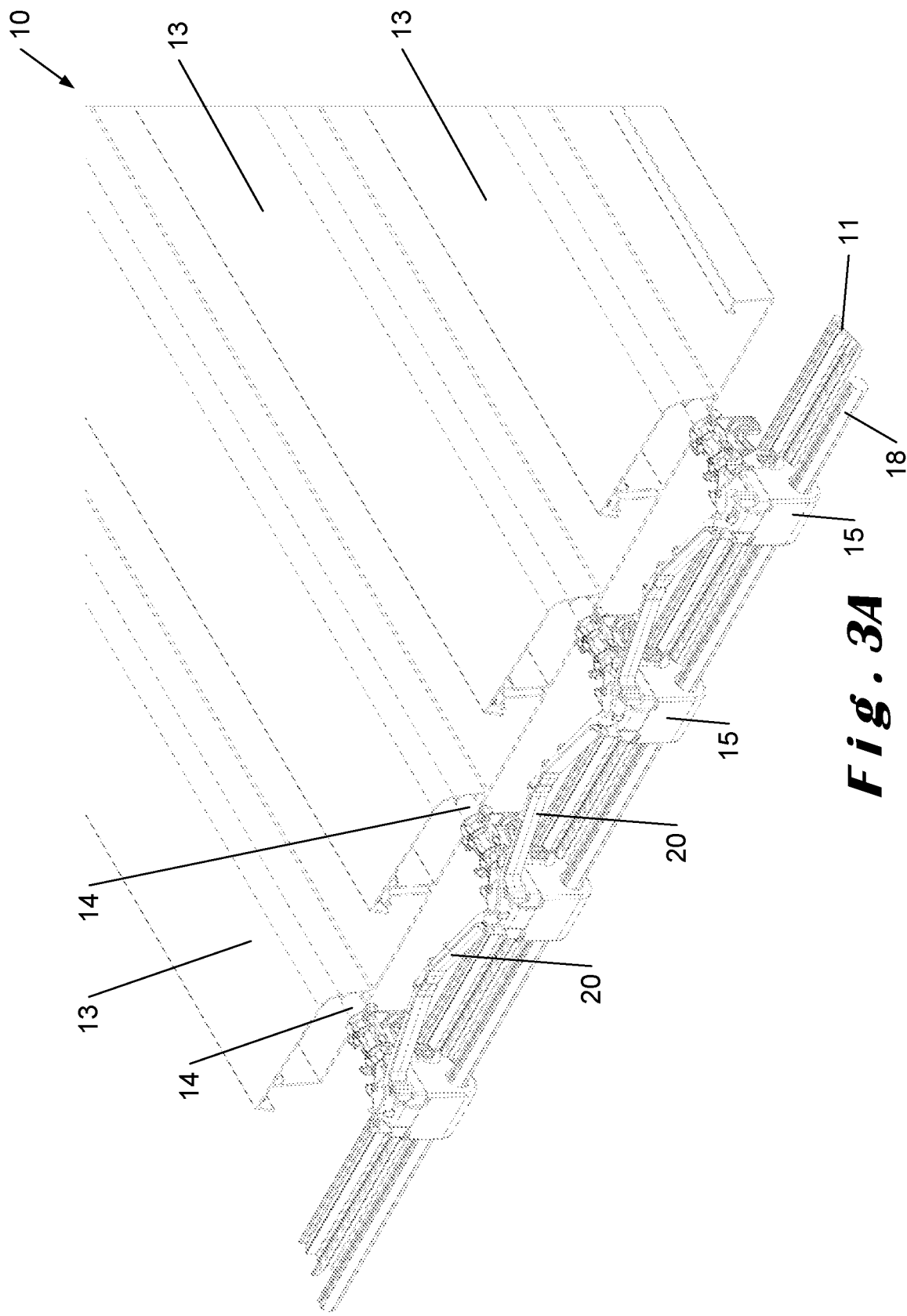
FIGS. 3A and 3B show a perspective view of the roof construction according to the current invention in the spread out position with the transverse elements closed or in a spread out position of the transverse elements.

According to the current invention, the slats are sliding in their open position in the terrace canopy 1 between a spread out position (shown in FIG. 3A) and a stacked position (shown in FIG. 3B) to increase the adjustment options regarding light incursion, radiant heat and ventilation. In other words, the roof construction encompasses displacement elements for sliding the transverse elements in the longitudinal direction between a spread out position and a stacked position, whereby the mutual distance between two successive transverse elements is less in the stacked position than in the spread out position. This type of sliding slat roof is already known in the state of the art and is described in more detail in BE 1022563 A1. Details of and alternatives for the displacement means are assumed to be known to the professional and are only described in a limited manner here.

In an embodiment not shown, it is possible that the roof cover is formed by two separate sets of transverse elements, whereby a first set slides to one side of the roof construction, and the second set slides to the opposite side of the roof construction. In this, the distance between two successive transverse elements is smaller in the stacked position than in the spread out position per each set of transverse elements, but not necessarily between the transverse elements of the various sets. For example, the middle transverse elements of the roof construction slide away from each other during the displacement of the sets of transverse elements from their spread out to their stacked positions.

The invention will be further described with reference to FIGS. 3 to 5 that shows the roof cover based on slats.

The roof construction 10 also has a frame that is formed by two longitudinal beams 11 (e.g. the pivot beams 3 of the terrace canopy 1 of FIG. 2) and two transverse beams (e.g. the tension beams of the terrace canopy 1 of FIG. 2). There are a number of slats 13 placed between the beams 11. More specifically, each slat 13 is equipped on its end with a slat axis 14 that is directly or indirectly connected with an associated beam 11. The slats 13 can be rotated toward the beams 11 around the slat axes 14 between a closed position (shown in FIG. 3A) and an open position (shown in FIG. 3B). Elements for the rotation of the slats 13 are assumed to be known to the professional and are not described further.

Figure 3B:
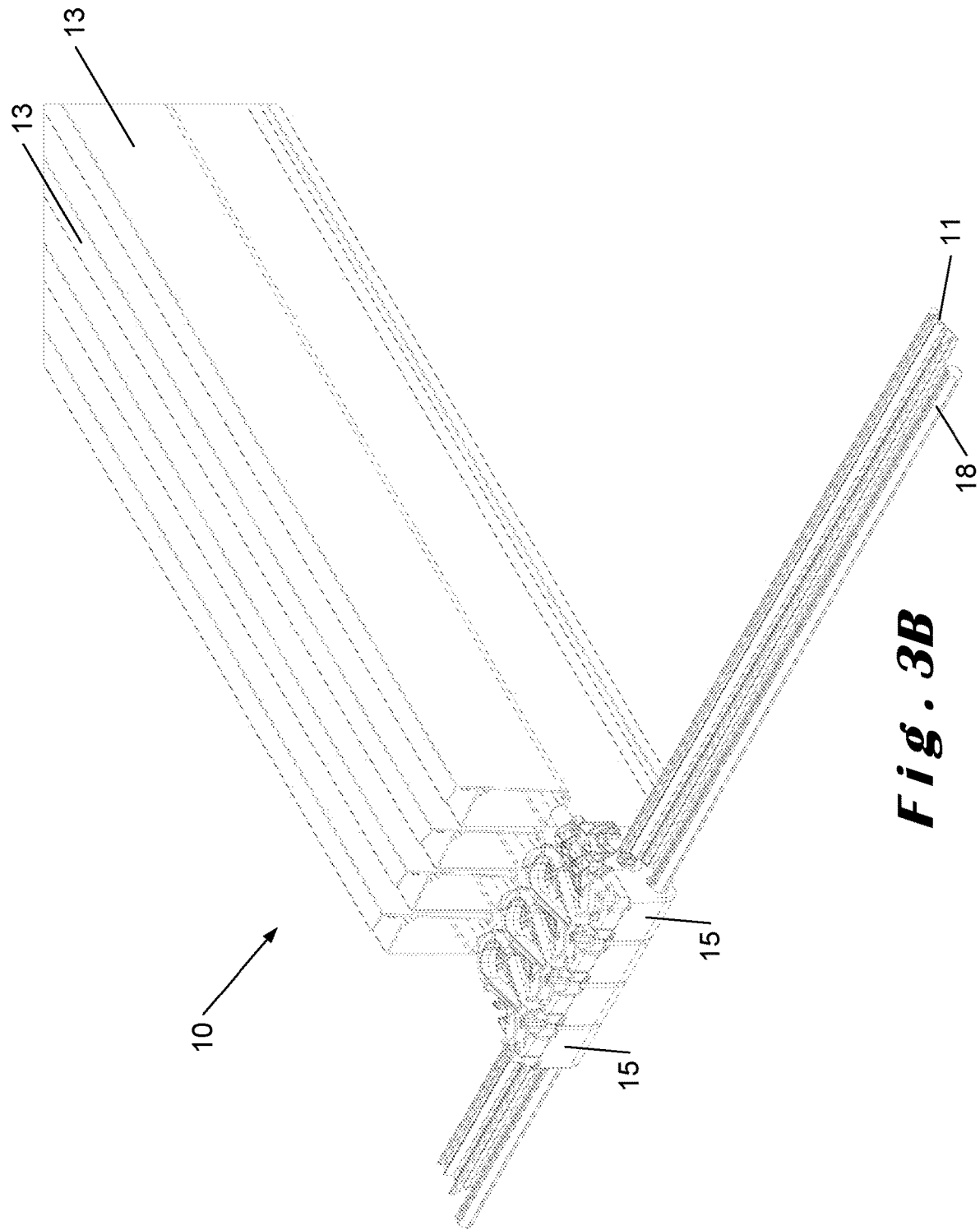
Figure 4A:
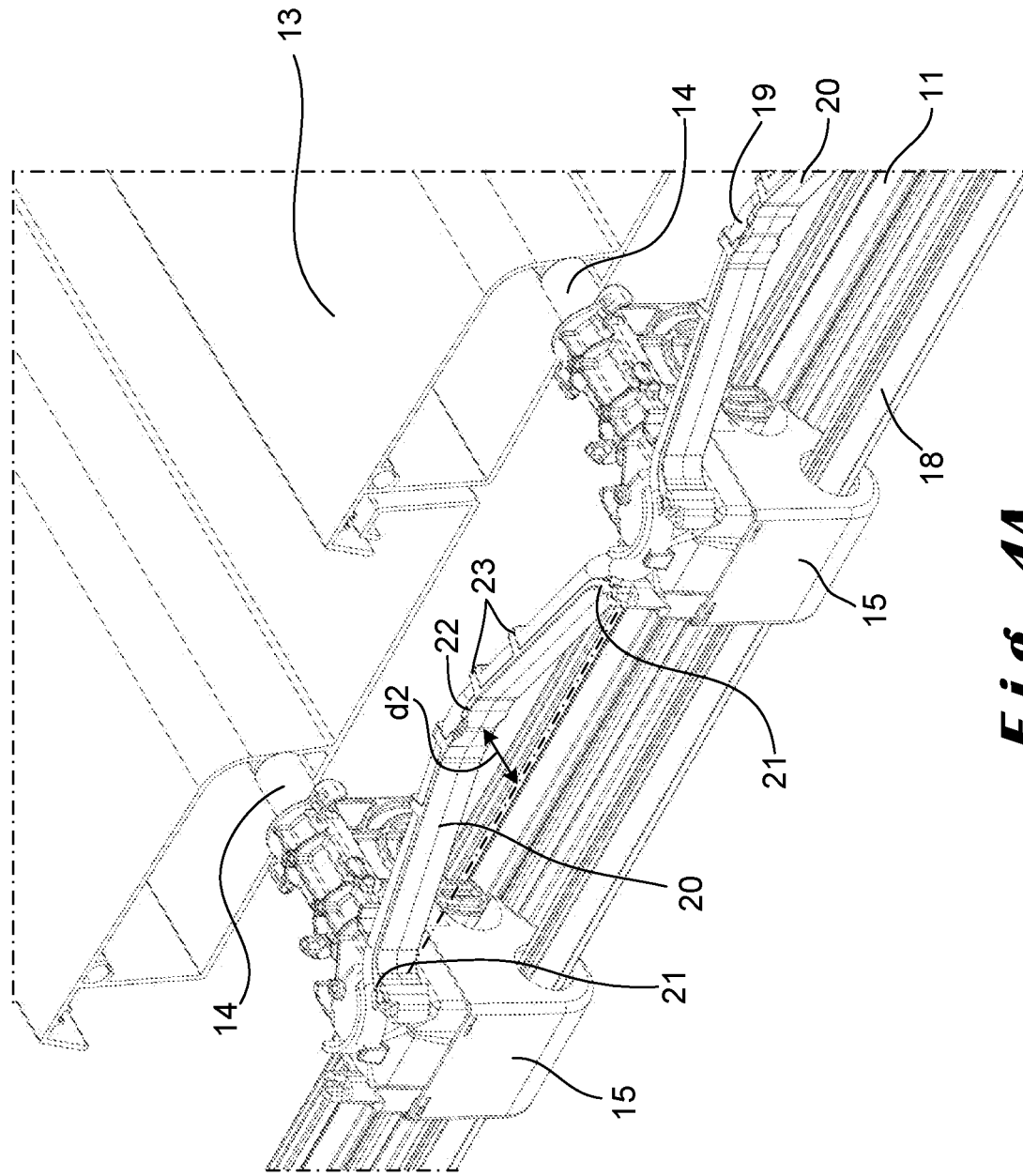
FIGS. 4A and 4B show a section of FIGS. 3A and 3B with a focus on the cable guides.

In the open position of the slats 13, these slide in the longitudinal direction of the roof construction 10 between a spread out position (shown in FIG. 3A) and a stacked position (shown in FIG. 3B). To slide the slats 13, there are slat axes 14 attached to the sliding support elements 15 that are attached to the beams 11. A drive shaft (not shown) is provided on at least one of the beams 11 so that a rotation of the drive shaft results in a displacement of the support elements 15. A motor (not shown) is provided for the actuation of the drive shaft. The support elements 15 are also guided on a guide rib 18 to increase the stability and reduce the possible torsion forces on the support elements 15.

Together, the drive shaft and the motor form displacement means for sliding the number of transverse elements, whereby each transverse element is formed by a slat 13, the slat axis 14 on opposite sides and the support elements 15 on which the slat axes 14 are attached.

In an embodiment not shown, the displacement means are formed by a motor that drives a chain, belt or the like connected to the outside of the transverse elements to pull a side of the roof element from that outermost transverse element and in doing such drags the other transverse elements. This type of drive is described, for example in EP 2631384 A1.

For provision of power to one or more of the slats 13, there is a power cable 19 provided that extends from the frame of the roof construction 10 to one or more slats 13. The power cable 19 can extend to any of the slats 13. In this way it is possible to integrate components or to attach them to the slat 13 that needs a power supply. These components are, for example, lighting modules (such as LED lighting), a heating module, a fan, an audio module, communication media (such as Wi-Fi, Bluetooth etc.), sensors, such as for rain, wind and/or light measurement etc. The power cable can also be used to transport generated power, such as if a sun panel is integrated into the slat 13. It must also be clear that other types of cables can be used instead of or in addition to a power cable 19. Examples are cables for communication for controlling integrated electrical and/or electronic modules or for transfer of data from the integrated electrical and/or electronic modules to an external entity. Other possible objectives of cables and other types of cables are known to the professional and the invention does not have to be limited to a specific cable type and/or specific application of electrical and/or electronic modules that can be integrated into or attached to the slat 13.

To prevent the power cable 19 being entangled in the slats 13, the displacement means or other components of the roof construction 10, cable guides 20 are provided between the successive transverse elements 13, 14, 15. These cable guides 20 are shown in FIG. 5. There is also a first cable guide (not shown) provided between the frame and the first transverse element 13, 14, 15. The first cable guide is preferably identical to the cable guides 20, but this does not necessarily have to be the case.

In the embodiment shown, the cable guides 20 extend out between successive support elements 15, but it is also possible to attach the cable guides to the successive slats 13. In this way, there is no influence by the cable guides 20 on the rotation movement of the slats 13. Each cable guide 20 is equipped with two ends 21 that each have a local rarefaction 26, the rarefaction 26 forms a groove 25. The support elements 15 are equipped with hooks 23 that match the grooves 25. The grooves 25 and the hooks 23 together form a click connection so that the cable guides 20 can quickly and easily be attached to the support elements 15 (e.g. without the use of tools).

Figure 5:
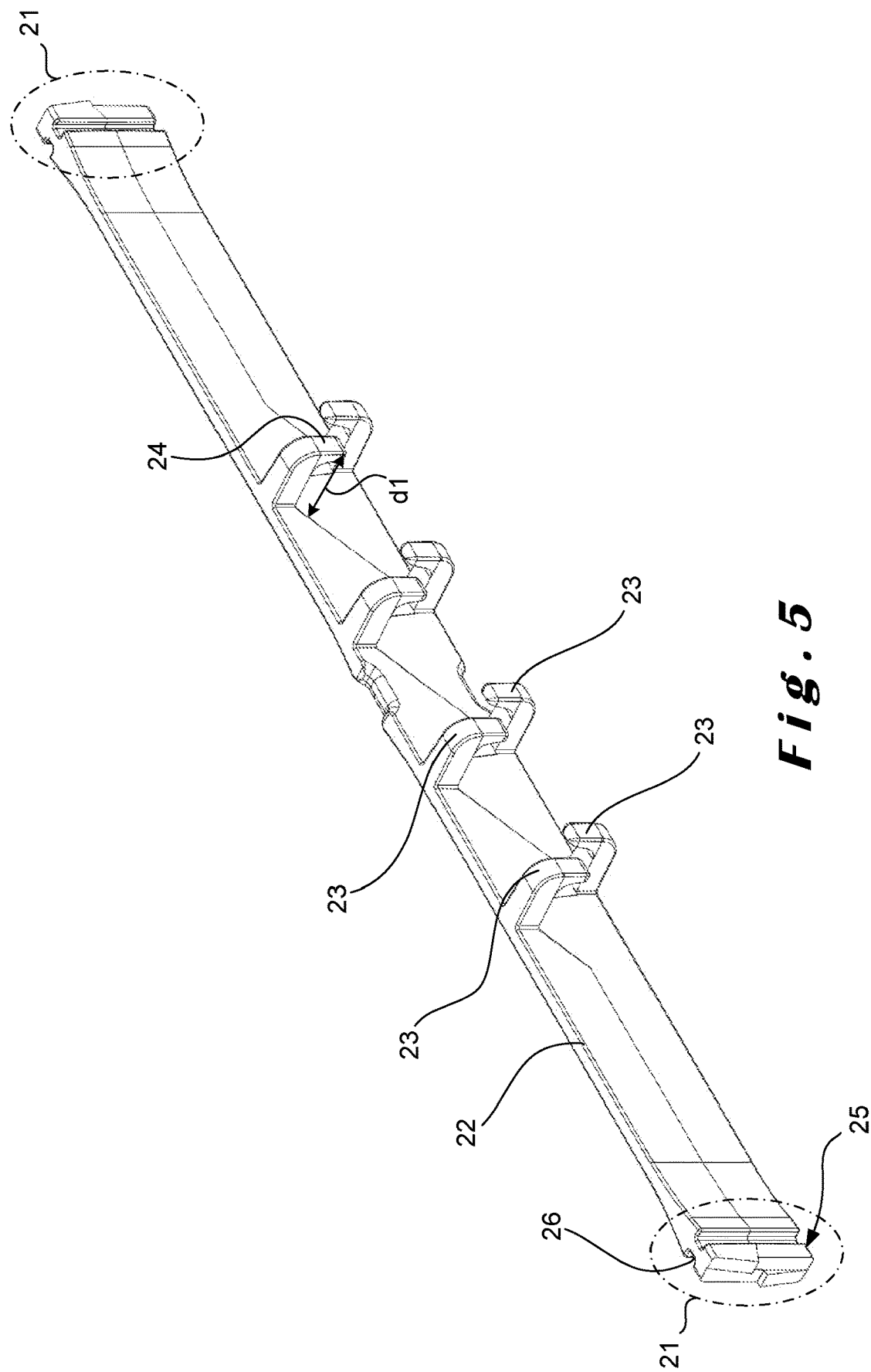
FIG. 5 shows a perspective view of a cable guide.

As shown in FIG. 5, the cable guides 20 have a spine 22 on which multiple hooks 23 are provided that extend toward the inside of the frame. In the embodiment shown, the hooks 23 are L-shaped, but other shapes, such as C-shaped are also possible. As already described, it is advantageous if the distance between the spine 22 and the furthest end of the hook 23 (i.e. the distance d1 to the outermost leg 24 of the L-shaped hook 23) is greater than the diameter of the power cable 19 so that there is play between the cable guide 20 and the power cable 19.

In the embodiment shown there are only a limited number of hooks 23 on the spine 22. The number of hooks 23 is dependent on both the shape and the material used and is determined in function of the necessary force to bend the power cable 19 and the ease of attaching the power cable 19. If the number of hooks 23 is increased, it is more difficult to place the cable 19 and if there are too few hooks 23, the cable 19 is not sufficiently secured. The hooks 23 are placed in pairs so that the cable 19 cannot slide over or under the spine 22 even with a limited number of hooks 23.

It is clear to the professional that the hooks 23 described above could also be replaced with other attachment means, such as Velcro, tension cables etc. to attach the power cable 19 to the spine 22 of the cable guides 20. The cable guides 20 can also be designed as a cable duct with the advantage that the power cable 19 is seated more securely but with a longer installation time as a result.

As described above, the cable guides 20 have the objective of avoiding the power cable 19 becoming entangled when the transverse elements 13, 14, 15 slide sideways. Depending on the concrete design of the transverse elements and the displacement means, there are many designs possible for the cable guides 20. A concrete example will be illustrated below.

Figure 4B:
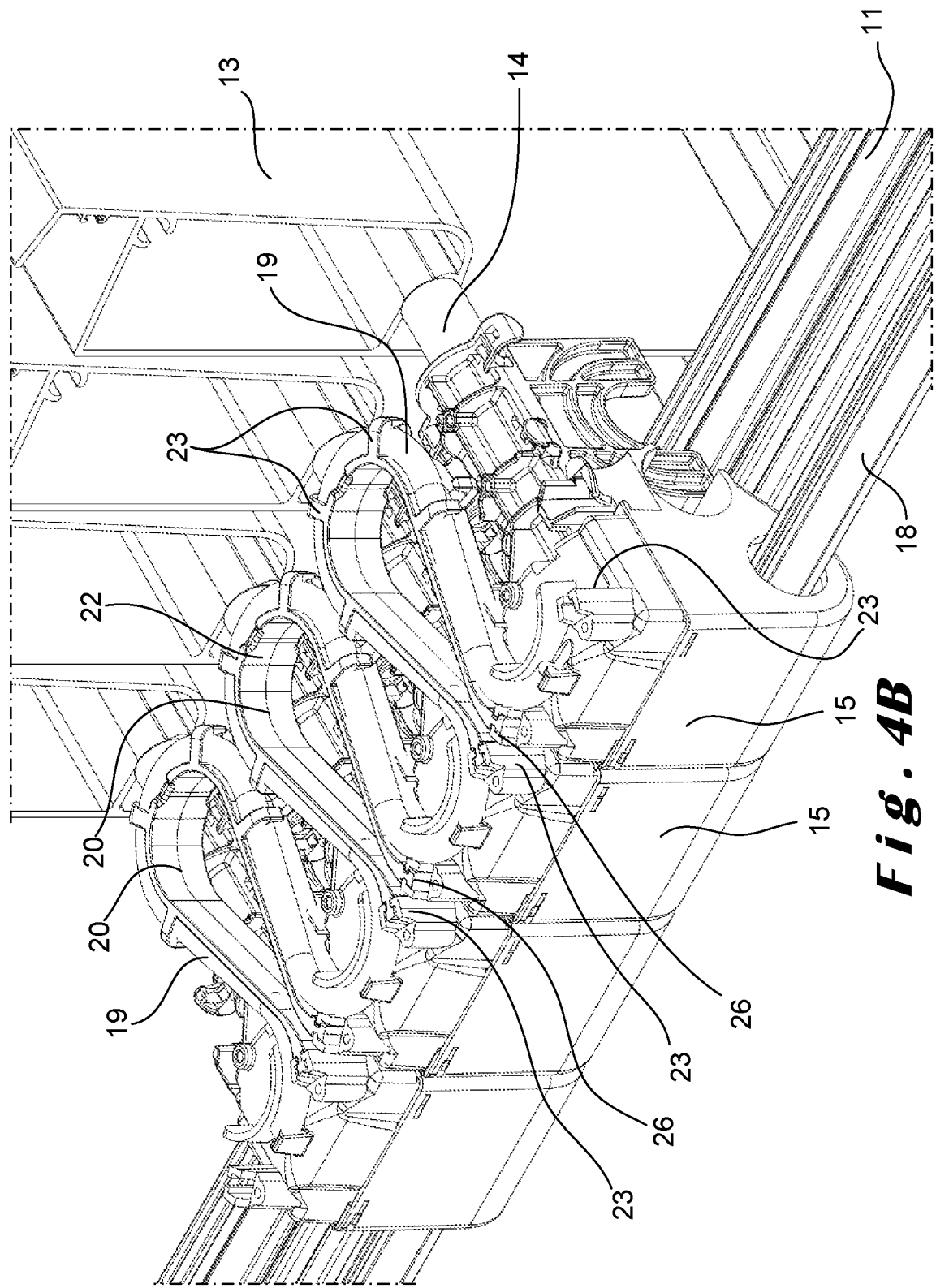

For this, the cable guides 20 are placed in a nearly horizontal surface, the surface is nearly parallel to the underside of the terrace canopy and which is located just above the displacement means and the support elements 15. It is also in this surface that the cable guides 20 fold when the slats 13 slide as shown in FIG. 4B. In other words, between the spread out position and the stacked position of the slats 13, the cable guides 20 fold (more generally, move) along a pre-determined path that is located in a surface, which is nearly parallel to the underside of the terrace canopy and thus does not overlap (meaning, is separate from) the displacement means. It may also be possible to make this surface sloping, such as under an angle of 45° so that the cable guides 20 gradually fold to the top side of the roof construction 10. Other pre-determined paths (along which the cable guides 20 move) that are separate from the displacement means and the support elements 15 are naturally also possible.

In the embodiment shown the cable guides, in the spread out position of the slats 13 have an arched form oriented toward the inside of the frame. Primarily, an arch shape is advantageous and with regard to the shape with a fold line because the arch results in less sharp angles when folding. In addition, the arch shape is advantageous because this inherently determines the pre-determined path considering that when the slats 13 slide together, the cable guides 20 will bend further toward the orientation where the initial bending goes.

The raise of the arc d2 of the arch shaped cable guides 20 is between 1% and 30% and preferably between 10% and 20% of the distance d3 between the ends 21 of the cable guides 20. The lower limit ensures that the cable guides 20, in the spread out position of the slats 13, are sufficiently bent so that they further fold in the desired direction when displacing the slats 13. The upper limit primarily limits the space necessary for cable guides 20 in both positions of the slats 13, because the higher the arc height, the longer the cable guide 20 is and thus more room is necessary in the roof construction for the cable guides 20 through 10 for the roof construction takes up more volume.

In general it is advantageous to have the cable guides 20 with a bend zone and/or a fold zone because the path along which the cable guides 20 move when the slats 13 slide is known, contrary to a flat cable guide 20 that can bend in at least two directions. A cable guide 20 with a bend zone and/or a fold zone must be greater than the distance between the ends 21 through the total length of the cable guide 20 in the installed position.

In the embodiment shown, the cable guides 20 are made in one piece using injection molding from plastic, preferably a thermoplastic, such as polyvinyl chloride (PVC), polyamide (PA), polyethylene (PE) or polypropylene (PP). This results in sufficiently stable cable guide 20 that is also sufficiently flexible so that no damage occurs through the repeated bending and relaxing when sliding the transverse elements. But other materials and designs are also possible other than that already described above.

As already described above, there are various designs possible for the cable guides 20. For example, it is possible to use a hinged cable guide that is made up of two metal plates onto which the power cable 19 is attached. There is also a cable guide with an accordion shape possible in the event that the power cable 19 is supple and bendable enough.

Even though certain aspects of the current invention are described with regard to specific embodiments, it is clear that these aspects can be implemented in other forms within the scope of protection as indicated by the conclusions.

The invention claimed is:

1. A roof construction for a terrace canopy, the roof construction comprising:
   a frame that has a transverse direction, a longitudinal direction, an interior and an exterior;
   a roof cover formed by a number of mutually parallel transverse elements (13, 14, 15) positioned on the inside of the frame, wherein each transverse element has a support element and a slat, wherein the slat has at least one end rotatably attached to a corresponding support elements, wherein the support elements are attached to the frame;
   a displacement means for sliding the support elements in the longitudinal direction between a spread out position and a stacked position; and
   a number of cable guides that are each attached between two successive transverse elements and together form at least a part of a cable guide for guiding the cable from the frame to at least one of the transverse elements.

2. The roof construction according to claim 1, wherein the cable guides have a first end connected to a corresponding first transverse element and a second end attached to a corresponding second transverse element, the ends of which, in the spread out position of the transverse elements are at a first distance from each other, wherein the total length of each cable guide is greater than the first distance.

3. The roof construction according to claim 2, wherein the cable guides, in the spread out position of the transverse elements, are at least partially arched with arc height (d2) that in particular is between 1% and 30%.

4. The roof construction according to claim 1, wherein the cable guides move along a predetermined path when the transverse elements are moved between their spread out position and the stacked position, wherein the predetermined path is separated from the movement elements and/or the predetermined path is located in a space that is mainly parallel to an underside of the frame and/or the predetermined path is separate from the transverse elements.

5. The roof construction according to claim 4, wherein the cable guides, in the spread out position of the transverse elements, have an arched shape oriented toward the inside of the frame.

6. The roof construction according to claim 1, wherein the cable guides have a spine including cable attachment elements that extend toward the inside of the frame and which are equipped for holding the cable listed.

7. The roof construction according to claim 6, wherein the cable attachment means are formed by at least one of the following: hooks, Velcro, and ties.

8. The roof construction according to claim 6, wherein the cable attachment elements are formed by hooks, wherein the hooks are L-shaped or C-shaped hooks, wherein at least some of the hooks are at a distance from (d1) the spine that is greater than 20% greater than the thickness of the cable.

9. The roof construction according to claim 1, wherein the cable guides have first attachment elements at the ends and that the transverse elements are equipped with two attachment elements, wherein the first of the two attachment elements together are provided for the attachment of the cable guides to the transverse elements.

10. The roof construction according to claim 9, wherein the first and second attachment elements comprise interlocking male and female elements.

11. The roof construction according to claim 10, wherein the female elements are formed by one or more grooves and the male elements by one or more hooks that together form a click connection.

12. The roof construction according to claim 1, wherein the cable guides are integrally made, using injection molding, of plastic, wherein the pastic is a thermoplastic such as polyvinyl chloride (PVC), polyamide (PA), polyethylene (PE) or polypropylene (PP) or an elastomer such as rubber, wherein the rubber is a thermoplastic elastomer or composite materials, wherien the composite materials are fiber-reinforced plastics such as fiberglass reinforced plastic.

13. The roof construction according to claim 1, wherein the ends of the cable guides are attached to the support elements.

14. The roof construction according to claim 13, wherein there is a distance between the ends of the slats and the cable guides in the stacked position of the transverse elements.

15. The roof construction according to claim 1, wherein at least one slat has at least one electrical component that is equipped with power via a power cable attached in the cable guides.

16. The roof construction according to claim 1, wherein the roof construction also has the cable which is attached in the cable guide.

17. The roof construction according to claim 1, wherein the roof construction has an additional cable guide attached between the frame and one transverse element, wherein the additional cable guide together with the other cable guides form a cable guide for encompassing the cable from the frame to at least one of the transverse elements.

18. A set of parts for building a roof construction, the roof construction comprising:
   a frame that has a transverse direction, a longitudinal direction, an interior and an exterior;
   a roof cover formed by a number of mutually parallel transverse elements positioned on the inside of the frame, wherein each transverse element has a support element and a slat, wherein the slat has at least one end rotatably attached to a corresponding support elements, wherein the support elements are attached to the frame;
   a displacement means for sliding the support elements in the longitudinal direction between a spread out position and a stacked position; and
   a number of cable guides that are each attached between two successive transverse elements and together form at least a part of a cable guide for guiding the cable from the frame to at least one of the transverse elements,
   wherein the set encompasses the frame, the transverse elements, the displacement means and the cable guides.

19. A terrace canopy encompassing a roof construction, the roof construction comprising:
   a frame that has a transverse direction, a longitudinal direction, an interior and an exterior;
   a roof cover formed by a number of mutually parallel transverse elements positioned on the inside of the frame, wherein each transverse element has a support element and a slat, wherein the slat has at least one end rotatably attached to a corresponding support elements, wherein the support elements are attached to the frame;
   a displacement means for sliding the support elements in the longitudinal direction between a spread out position and a stacked position; and
   a number of cable guides that are each attached between two successive transverse elements and together form at least a part of a cable guide for guiding the cable from the frame to at least one of the transverse elements.

20. The roof construction according to claim 2, wherein the cable guides, in the spread out position of the transverse elements, are at least partially arched with arc height (d2) that is between 10% and 20% of the first distance.

* * * * *